United States Patent

Tokuyoshi

[19]

[11] Patent Number: 5,838,953
[45] Date of Patent: Nov. 17, 1998

[54] INFORMATION PROCESSING APPARATUS

[75] Inventor: Takahiro Tokuyoshi, Tokyo, Japan

[73] Assignee: Kabushiki Kaisha Toshiba, Kawasaki, Japan

[21] Appl. No.: 800,172

[22] Filed: Feb. 13, 1997

[30]       Foreign Application Priority Data

Feb. 13, 1996   [JP]   Japan ................................. 8-025299

[51] Int. Cl.$^6$ .................................................. G06F 9/455
[52] U.S. Cl. ................................... 395/500; 395/580
[58] Field of Search ................... 395/500, 580, 395/586

[56]            References Cited

U.S. PATENT DOCUMENTS

| | | | |
|---|---|---|---|
| 5,129,064 | 7/1992 | Fogg, Jr. et al. | 395/275 |
| 5,530,875 | 6/1996 | Wach | 395/737 |
| 5,592,674 | 1/1997 | Gluska et al. | 395/742 |
| 5,594,905 | 1/1997 | Mital | 395/733 |

FOREIGN PATENT DOCUMENTS

3-168836   7/1991   Japan .

*Primary Examiner*—Kevin J. Teska
*Assistant Examiner*—Ayni Mohamed
*Attorney, Agent, or Firm*—Foley & Lardner

[57]            ABSTRACT

The present invention has the following arrangement. That is, an instruction stream for performing an instruction simulation is analyzed before the instruction simulation is started to predict a timing at which interruption occurs, an interrupt generating unit generates a predictive interrupt signal one instruction cycle before interruption occurs on the basis of the prediction result, and, when an instruction which is executed immediately after the predictive interrupt signal is generated has a flag-less instruction identifier, an execution process of the instruction which is executed immediately after the predictive interrupt signal is generated is performed according to not a flag-less instruction code but a flag instruction code.

3 Claims, 6 Drawing Sheets

INFORMATION PROCESSING APPARATUS

BACKGROUND OF THE INVENTION

1. Technical Field

The present invention relates to an information processing apparatus which employs a method of increasing the speed of an instruction simulation.

2. Prior Art

When an instruction simulation for a microprocessor, a method of omitting a flag operation procedure may be employed. This is based on an experience in which a large number of flag operation procedures related to a flag which is overwritten without being referred to are present in an instruction stream executed by a microprocessor. For this reason, when the instruction simulation for the microprocessor is performed, no flag operation procedure related to the flag which is overwritten without being referred to is required. Therefore, in order to increase the speed of the instruction simulation, the instruction stream is analyzed before the instruction simulation is performed. When it is determined on the basis of the analysis result that an instruction has a flag operation procedure which can be omitted, the flag operation procedure can be omitted.

However, when an instruction simulation is performed in consideration of interruption, a method of omitting an unnecessary flag operation procedure cannot be used. This is because the flag may be referred to by the interrupt process procedure when interruption occurs, and the behavior of the interrupt process changes by omitting the flag operation procedure.

In the prior art described above, a reason why the flag operation procedure cannot be omitted will be described below with reference to FIGS. 1 and 2.

Figure 1:
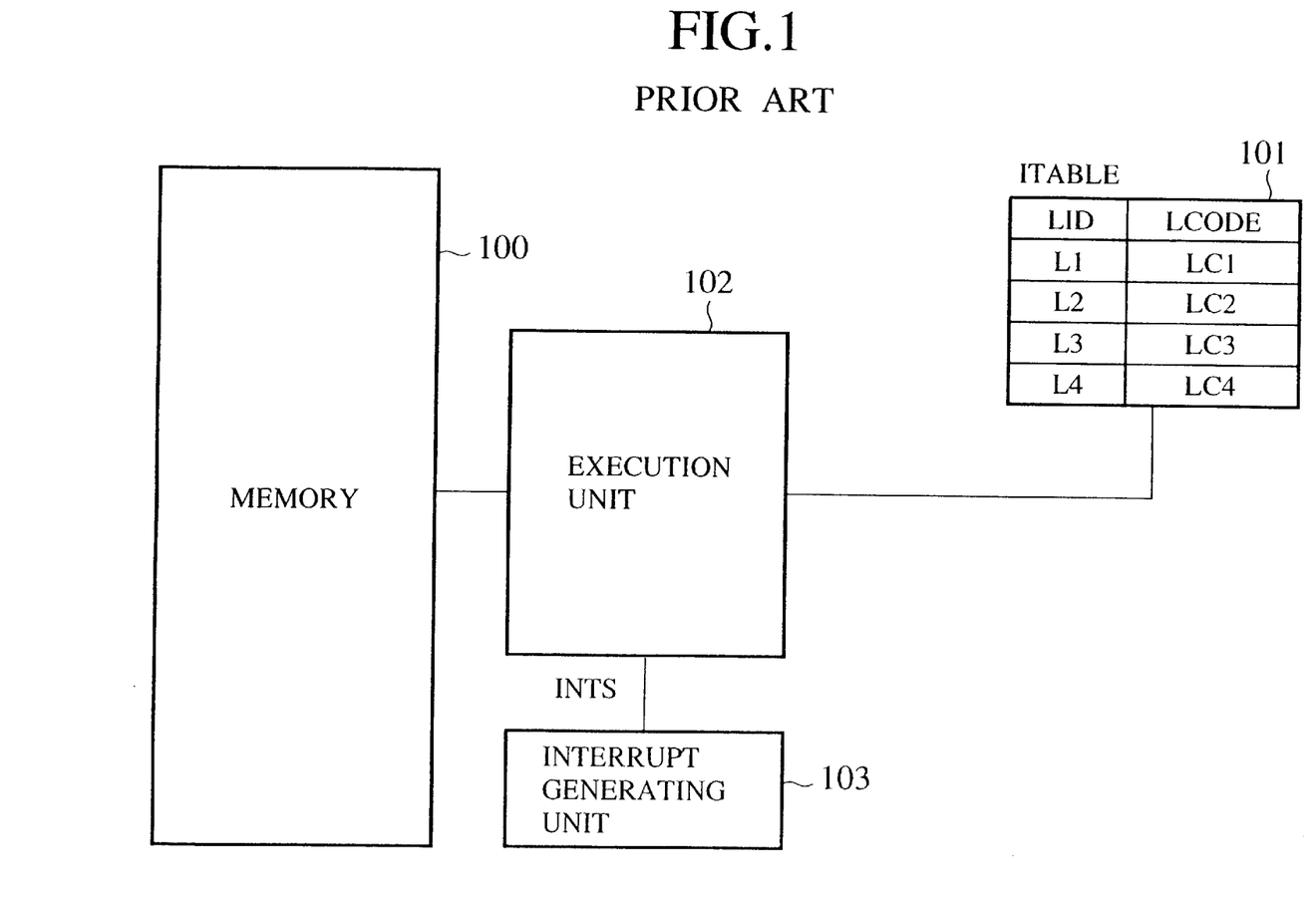
FIG. 1 is a block diagram showing the arrangement of a conventional information processing apparatus.

The arrangement of an information processing apparatus used when an instruction simulation including an interrupt process is shown in FIG. 1.

Referring to FIG. 1, a memory 100 of an information processing apparatus for performing an instruction simulation stores an instruction stream required for the instruction simulation. Each instruction in the instruction stream is constituted by one instruction identifier and other data. The instruction stream is analyzed before the instruction simulation is started, and a flag instruction identifier of an instruction including a flag operation procedure which can be omitted is converted into a flag-less instruction identifier. The instruction stream is divided into an user procedure and an interrupt process procedure.

An instruction code storage unit (ITABLE) 101 stores a plurality of flag instruction identifiers (LID) L1 to L4 which identifies a flag instruction code, and flag instruction codes (LCODE) LC1 to LC4 which correspond to the flag instruction identifiers and form a code stream for realizing the instruction.

An execution unit 102 reads instructions from an instruction stream stored in the memory 100 and extracts an instruction identifier of the instruction. An instruction code is extracted from the instruction code storage unit 101 using the instruction identifier, and a procedure which is required to execute the instruction is repeated on the basis of the extracted instruction code.

An interrupt generating unit 103 generates an interrupt signal to show generation of interruption, and notifies the generated interrupt signal to the execution unit 102.

Figure 2:
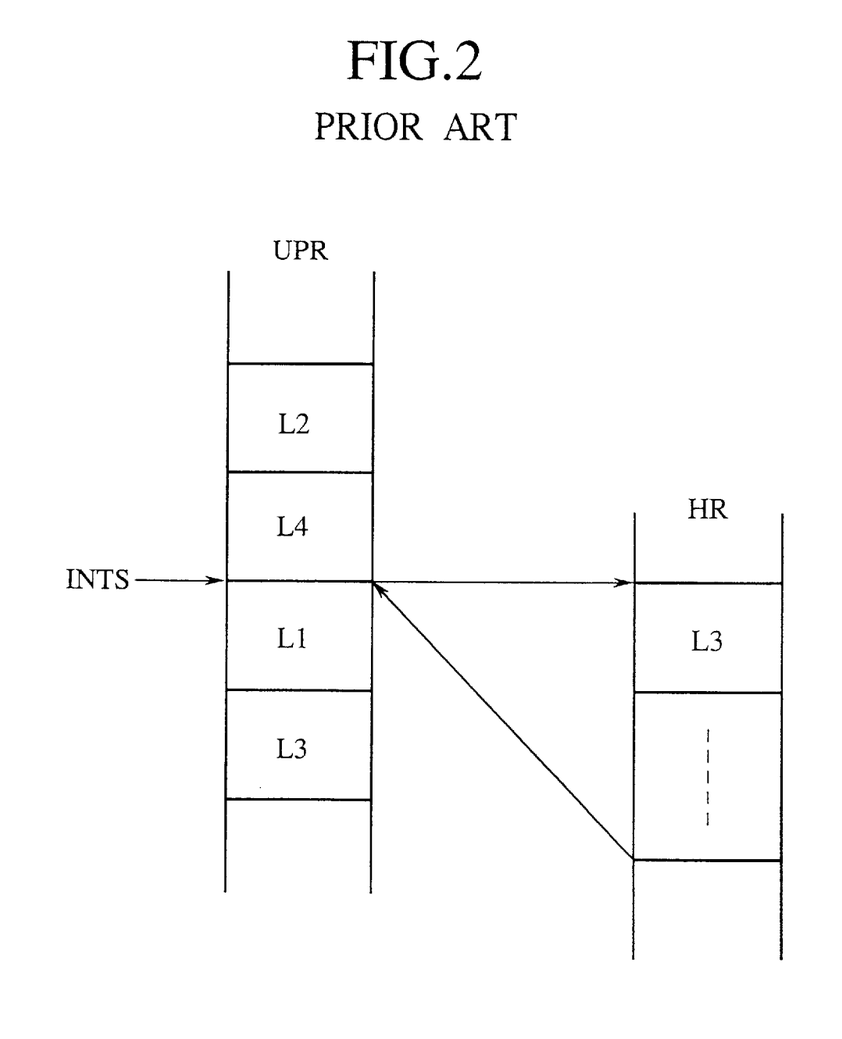
FIG. 2 is a view showing a process flow of the apparatus shown in FIG. 1.

The flow of a process performed when the interruption occurs is shown in FIG. 2.

In FIG. 2, reference symbols L1, L2, 13, and L4 are instructions in a user procedure (UPR). It is assumed that the instructions L1 and L2 do not refer to flags, and that the instructions L3 and L4 refer to flags. It is assumed that all the instructions L1, L2, L3, and L4 change flags.

Referring to FIG. 2, when interruption does not occur, an execution order of the instructions is L2, L4, L1, and L3.

It is assumed that interruption occurs immediately after the instruction L4 is executed. In this case, the flow of execution shifts to an interrupt process procedure (HR). After the instruction stream in the interrupt process procedure (HR) is executed, the flow shifts back to an instruction immediately after the instruction L4, i.e., the instruction L1.

In this case, when no interruption occurs, the flag operation procedure of the instruction L4 can be omitted. However, when interruption occurs immediately after the instruction L4 is executed, since a flag may be referred to in the interrupt process procedure (HR), the flag operation procedure of the instruction L4 cannot be omitted.

Interruption may occur at arbitrary time. As a result, all the flag operation procedures cannot be omitted.

As a prior art for omitting an operation flag process to increase the speed, the following invention is described in, e.g., Japanese Unexamined Patent Publication No. 3-168836. That is, in an emulation processor which processes a native instruction inherent in the processor and generates a native instruction stream for simulating an operation in accordance with a target instruction of another type of a processor, an operation flag generation target instruction and an operation flag reference instruction are detected by a pre-decoder, unique tags are added to these instructions, respectively, and a plurality of instructions (target instructions) processed by the pre-decoder are held in an instruction stack. It is determined on the basis of the tags of the target instructions on the instruction stack and the leading target instruction on the instruction stack whether an operation flag process for the target instructions is performed, and the operation flag process is omitted according to the determination result, thereby increasing emulation speed.

As described above, in a conventional information processing apparatus for performing an instruction simulation, a method in which a flag operation procedure of an instruction whose flag operation procedure can be omitted is omitted to increase the speed of the instruction simulation is employed.

However, when an instruction simulation is performed in consideration of interruption, since a flag may be referred to in an interrupt process, a flag operation procedure cannot be omitted. For this reason, the speed of the instruction simulation cannot be easily increased.

SUMMARY OF THE INVENTION

The present invention has been made in consideration of the above circumstances, and has as its object to provide an information processing apparatus in which, even if an instruction simulation is performed in consideration of interruption, a method of omitting a flag operation procedure to increase a speed can be used.

In order to achieve the above object, there is provided an information processing apparatus comprising: a memory for storing an instruction stream which is constituted by instructions having instruction identifiers including a plurality of flag instruction identifers and a plurality of flag-less instruction identifiers and is required for an instruction simulation, and is analyzed before an instruction simulation is started, and in which a flag instruction identifier of an instruction whose flag operation procedure can be omitted is changed into a flag-less instruction identifier; an instruction code storage unit for storing the flag instruction identifiers of the instructions and flag instruction codes corresponding to the respective flag instruction identifiers, and the flag-less instruction identifiers of the instructions and flag-less instruction codes corresponding to the flag-less instruction identifiers; an interrupt generating unit for generating an interrupt signal and generating a predictive interrupt signal one instruction cycle before interruption occurs on the basis of a prediction result obtained by predicting a timing at which interruption occurs by analyzing the instruction stream stored in the memory before the instruction simulation is started; and an execution unit for sequentially reading the instructions from the memory, extracting the instruction identifiers of the read instructions, reading the instruction codes corresponding to the extracted instruction identifiers from the instruction code storage unit, performing an execution process to the instructions on the basis of the read instruction codes, and when a predictive interrupt signal is generated by the interrupt generating unit and an instruction executed immediately after the predictive interrupt signal is generated has a flag-less instruction identifier, when performing an execution process to the instruction executed immediately after according to a flag instruction identifier and performing an execution process to an interrupt process procedure on the basis of the interrupt signal generated by the interrupt generating unit.

Further, in order to achieve the above object, there is provided an information processing apparatus comprising: a memory for storing an instruction stream which is constituted by instructions having instruction identifiers including a plurality of flag instruction identifiers and a plurality of flag-less instruction identifiers and is required for an instruction simulation, and is analyzed before an instruction simulation is started, and in which a flag instruction identifier of an instruction whose flag operation procedure can be omitted is changed into a flag-less instruction identifier; an instruction code storage unit for storing the flag instruction identifiers of the instructions and flag instruction codes corresponding to the respective flag instruction identifiers, and the flag-less instruction identifiers of the instructions and flag-less instruction codes corresponding to the flag-less instruction identifiers; a peripheral simulator, serving as a simulator for a peripheral device, for generating an interrupt signal, and generating a predictive interrupt signal one instruction cycle before interruption occurs on the basis of a prediction result obtained by predicting a timing at which interruption occurs by analyzing the instruction stream stored in the memory before the instruction simulation is started; an execution unit for sequentially reading the instructions from the memory, extracting the instruction identifiers of the read instructions, reading the instruction codes corresponding to the extracted instruction identifiers from the instruction code storage unit, performing an execution process to the instructions on the basis of the read instruction codes, and when a predictive interrupt signal is generated by the peripheral simulator and an instruction executed immediately after the predictive interrupt signal is generated has a flag-less instruction identifier, then performing an execution process to the instruction executed immediately after according to a flag instruction code and performing an execution process to an interrupt process procedure on the basis of the interrupt signal generated by the interrupt generating unit; and a bus simulator, to which the memory, the peripheral simulator, and the execution unit are connected to perform input control thereof, for giving the predictive interrupt signal generated by the peripheral simulator to the execution unit.

Furthermore, in order to achieve the above object, there is provided an information processing apparatus comprising: a shared memory for storing an instruction stream which is constituted by instructions having instruction identifiers including a plurality of flag instruction identifiers and a plurality of flag-less instruction identifiers and is required for an instruction simulation, and is analyzed before an instruction simulation is started, and in which a flag instruction identifier of an instruction whose flag operation procedure can be omitted is changed into a flag-less instruction identifier; a plurality of instruction code storage units for storing the flag instruction identifiers of the instructions and flag instruction codes corresponding to the respective flag instruction identifiers, and the flag-less instruction identifiers of the instructions and flag-less instruction codes corresponding to the flag-less instruction identifiers; a plurality of peripheral simulators, serving as a simulator for a peripheral device, for generating an interrupt signal, and generating a predictive interrupt signal one instruction cycle before interruption occurs on the basis of a prediction result obtained by predicting a timing at which interruption occurs by analyzing the instruction stream stored in the shared memory before the instruction simulation is started; a plurality of execution units, which correspond to the plurality of instruction code storage units, for sequentially reading the instructions from the shared memory, extracting the instruction identifiers of the read instructions, reading the instruction codes corresponding to the extracted instruction identifiers from the corresponding instruction code storage unit, performing an execution process to the instructions on the basis of the read instruction codes, and when a predictive interrupt signal is generated by the peripheral simulator and an instruction executed immediately after the predictive interrupt signal is generated has a flag-less instruction identifier, then performing an execution process to the instruction executed immediately after according to a flag instruction code and performing an execution process to an interrupt process procedure on the basis of the interrupt signal generated by the interrupt generating unit; a signal control unit which receives the predictive interrupt signal generated by the plurality of peripheral simulators to give the predictive interrupt signal to an execution unit corresponding to the predictive interrupt signal; and a bus simulator, to which the shared memory, the plurality of peripheral simulators, and the plurality of execution units are connected to perform input control thereof.

The nature, principle and utility of the invention will become more apparent from the following detailed description when read in conjunction with the accompanying drawings.

DESCRIPTION OF THE PREFERRED EMBODIMENTS

Embodiments of the present invention will be described below with reference to the accompanying drawings.

Figure 3:
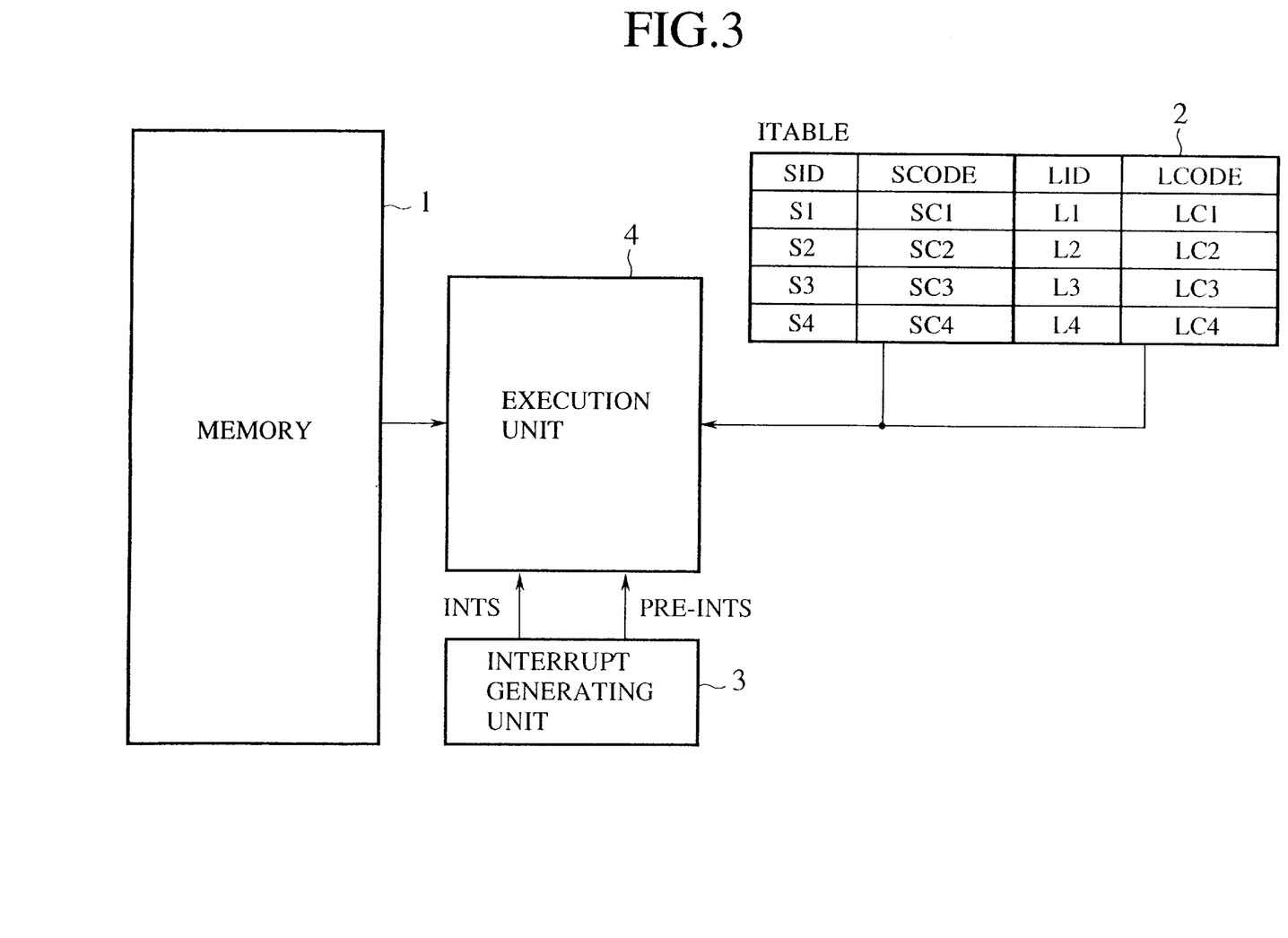
FIG. 3 is a block diagram showing the arrangement of an information processing apparatus according to the first embodiment of the present invention.

FIG. 3 is a block diagram showing the arrangement of an information processing apparatus according to the first embodiment of the present invention.

Characteristic features of this embodiment are as follows. In an instruction simulation, an instruction stream for performing the instruction simulation is analyzed before the instruction simulation is started, a timing at which interruption may occur is predicted, and a predictive interrupt signal is generated one instruction cycle before interruption occurs on the basis of the prediction result. An instruction having a flag-less instruction identifier is replaced with an instruction having a flag instruction identifier by the predictive interrupt signal, and an execution process is performed to the instruction by the flag instruction code corresponding the replaced flag instruction identifier to perform a flag operation, thereby updating the flags. In this case, even if an instruction signal is generated next to the predictive interrupt signal to perform an interrupt process, and the flags are referred to, correct flags are referred to.

In FIG. 3, the information processing apparatus comprises a memory 1, an instruction code storage unit 2, an interrupt generating unit 3, and an execution unit 4.

The memory 1 stores an instruction stream which is constituted by instructions having instruction identifiers including a plurality of flag instruction identifiers and a plurality of flag-less instruction identifiers and is required for an instruction simulation. The stored instruction stream is analyzed before the instruction simulation is started, and an instruction which has a flag instruction identifier and whose flag operation procedure can be omitted is converted into an instruction having an flag-less instruction identifier.

The instruction code storage unit (ITABLE) 2 stores the flag instruction identifiers of the instructions and flag instruction codes corresponding to the respective flag instruction identifiers, and stores the flag-less instruction identifiers of the instructions and flag-less instruction codes corresponding to the respective flag-less instruction identifiers. Flag instruction identifiers (LID) L1 to L4 are identifiers for identifying flag instruction codes, and flag instruction codes (LCODE) LC1 to LC4 is a code stream for realizing flag instructions. Flag-less instruction identifiers (SID) S1 to S4 are identifiers for identifying flag-less instruction codes, and flag-less instruction codes (SCODE) SC1 to SC4 are a code stream obtained by omitting a flag operation procedure of a code stream for realizing the instructions.

The interrupt generating unit 3 generates an interrupt signal (INTS) and a predictive interrupt signal (PRE-INTS). An instruction stream for performing an instruction simulation stored in the memory 1 is analyzed before the instruction simulation is started, a timing at which instruction may occur in the instruction stream is predicted by the analysis, and on the basis of the prediction result, the interrupt generating unit 3 generates a predictive interrupt signal one instruction cycle before the interruption occurs. In an actual execution process, since interruption occurs at arbitrary time, the predictive interrupt signal cannot be generated one instruction cycle before the interruption occurs. However, when an instruction simulation is executed by the above method, the predictive interrupt signal can be generated one instruction cycle before interruption occurs.

The execution unit 4 sequentially reads instructions from the memory 1, extracts instruction identifiers of the read instructions, reads instruction codes corresponding the extracted instruction identifiers from the instruction code storage unit 2, and performs an execution process to the instructions on the basis of the read instruction codes. The execution unit 4 receives the predictive interrupt signal generated by the interrupt generating unit 3. When an instruction which is executed immediately after the predictive interrupt signal is generated has a flag-less instruction identifier, the execution unit 4 replaces the instruction having the flag-less instruction identifier with an instruction having a flag instruction identifier, and performs an execution process according to a flag instruction code corresponding to the replaced instruction.

An operation of an instruction simulation in the arrangement will be described below with reference to FIG. 4.

Figure 4:
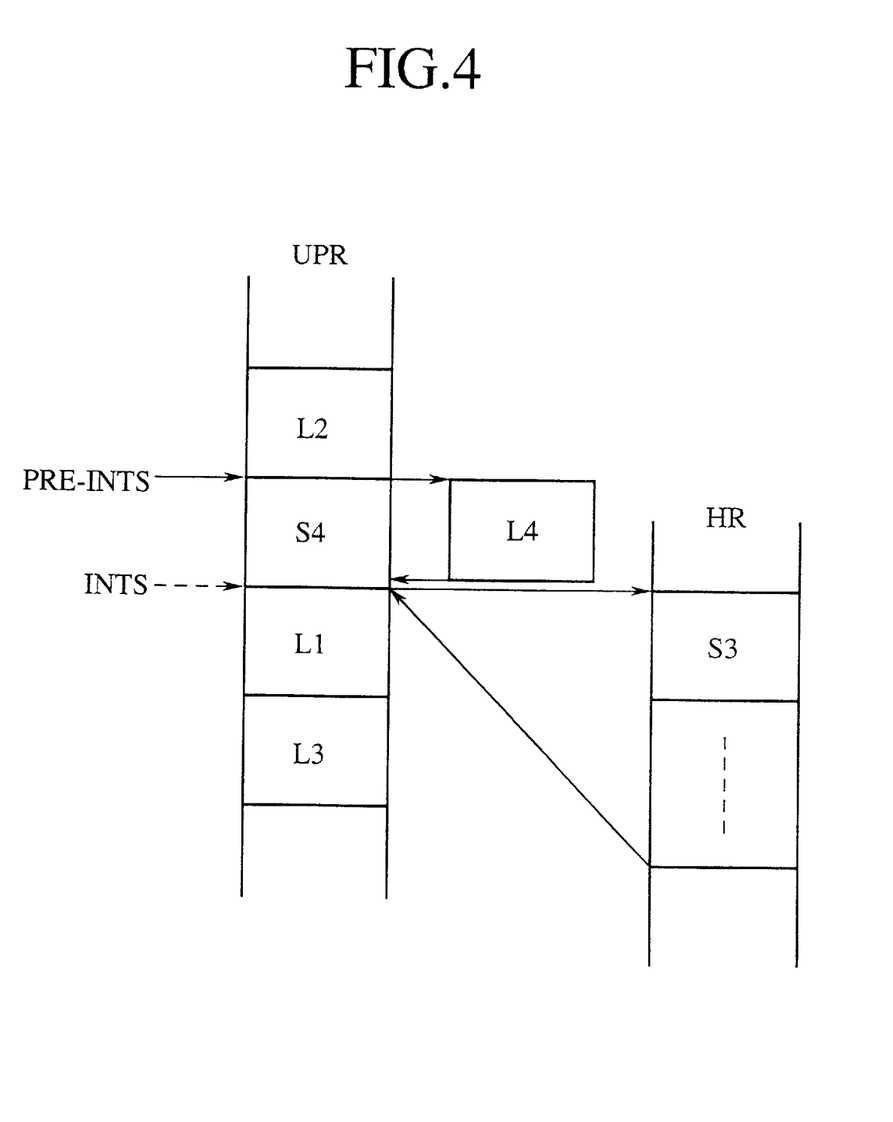
FIG. 4 is a view showing a process flow of the apparatus shown in FIG. 3.

Referring to FIG. 4, an instruction stream in a user procedure (UPR) is the same as that shown in FIG. 2. Since the instruction L1 which is executed immediately after the instruction L4 is executed does not refer to a flag, the instruction L4 is regarded as an instruction having a flag operation procedure which can be omitted to increase the speed of an instruction simulation, and is replaced with the instruction S4 whose flag operation procedure is omitted. This replacement process is performed by analyzing the instruction stream before the instruction simulation is started. A timing at which interruption occurs is predicted by analyzing the instruction stream before the instruction simulation is started, here it is assumed that, for example, interruption occurs immediately after the instruction S4 is executed.

Since the interrupt generating unit 3 generates a predictive interrupt signal one instruction cycle before the interrupt signal, the predictive interrupt signal is given to the execution unit 4 immediately after the instruction L2 is executed. The execution unit 4 which receives the predictive interrupt signal, an instruction, i.e., S4, which is executed immediately after the instruction L2 is executed is replaced with the instruction L4, and the replaced instruction L4 is executed.

Since, by performing the replacement process, the flag operation procedure is performed without being omitted, the flag holds a correct value immediately after the instruction L4 is executed. In this manner, when the execution unit 4 receives the interrupt signal, the execution unit 4 shifts the flow of execution to the interrupt process procedure (HR). However, even if a flag is referred to in the interrupt process procedure (HR), the behavior is correct.

Therefore, in the instructions having flag instruction identifiers, a flag operation procedure of an instruction whose flag operation procedure can be omitted is omitted, and no disadvantage occurs when an interrupt process is performed in the instruction simulation. In this manner, a method of omitting a flag operation procedure to increase the speed can be used, and an instruction simulation having a speed which is considerably higher than that of a conventional instruction simulation can be obtained.

Figure 5:
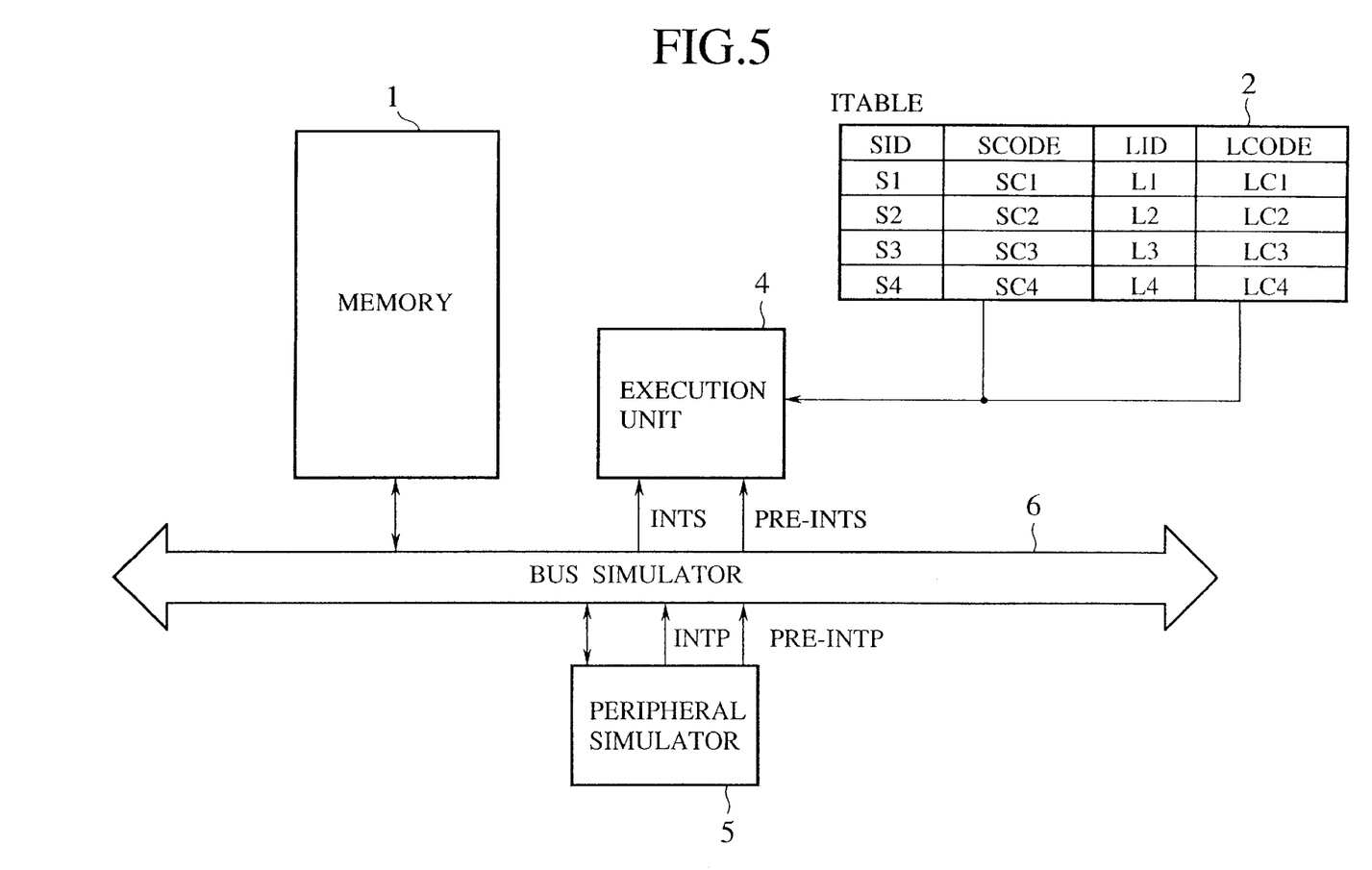
FIG. 5 is a block diagram showing the arrangement of an information processing apparatus according to the second embodiment of the present invention.

FIG. 5 is a block diagram showing the arrangement of an information processing apparatus according to the second embodiment of the present invention.

The characteristic features of this embodiment are as follows. That is, in the embodiment shown in FIG. 3, a peripheral simulator 5 is arranged in place of the interrupt generating unit 3 shown in FIG. 3, the memory 1, the execution unit 4, and the peripheral simulator 5 are connected to each other through a bus simulator 6. The remaining arrangement of the second embodiment is the same as that of the embodiment shown in FIG. 3.

The peripheral simulator 5 serves as a simulator for a peripheral device in the information processing apparatus, and generates an interrupt signal (INTP) and a predictive interrupt signal (PRE-INTP) as the interrupt generating unit 3 shown in FIG. 3 does. The bus simulator 6 controls an input/output operation among the memory 1, the execution unit 4, and the peripheral simulator 5, and the predictive interrupt signal generated by the peripheral simulator 5 is supplied to the execution unit 4 through the bus simulator 6.

In this arrangement, when the peripheral simulator 5 causes interruption to occur, the peripheral simulator 5 supplies an interrupt signal (INTP) to the bus simulator 6, and the bus simulator 6 supplies an interrupt signal (INTS) to the execution unit 4. The peripheral simulator 5 supplies a predictive interrupt signal (PRE-INTP) to the bus simulator 6 one instruction cycle before the interruption occurs, and the bus simulator 6 supplies the predictive interrupt signal (PRE-INTS) to the execution unit 4.

An operation of the execution unit 4 when the execution unit 4 receives the interrupt signal (INTS) and the predictive interrupt signal (PRE-INTS) is the same as that in the embodiment shown in FIG. 3.

Since all the timing at which interruption occurs are not given to the peripheral simulator 5, the peripheral simulator 5 cannot correctly generate the predictive interrupt signal (PRE-INTP). However, even if the peripheral simulator 5 generates an erroneous predictive interrupt signal (PRE-INTP) to supply it (PRE-INTS) to the execution unit 4, although the execution time is slightly prolonged, the behavior of the user procedure (UPR) itself is correct. Therefore, on the basis of estimation, the peripheral simulator 5 can generate an excessive number of predictive interrupt signals (PRE-INTP) without any problem.

As described above, since the number of predictive interrupt signals is slightly larger than that in the embodiment shown in FIG. 3, an execution time of an instruction simulation is relatively long. However, the execution time of the instruction simulation can be made shorter than that in a conventional method in which a flag operation procedure is not omitted.

The present invention is effectively used for not only a case wherein all the timings as which an interrupt signal is generated are given, but also an instruction simulation having an arrangement including a peripheral simulator as in this embodiment.

Figure 6:
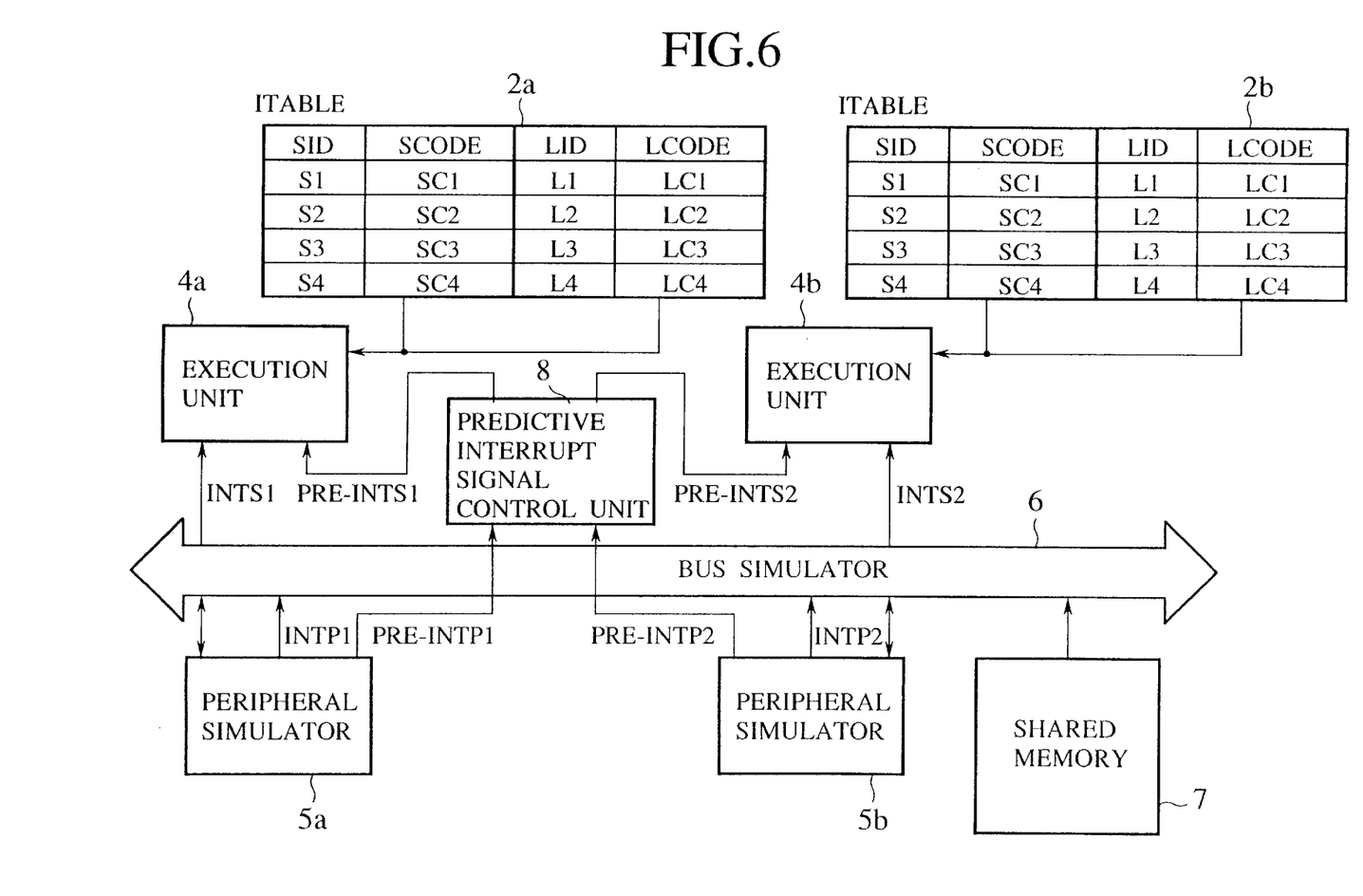
FIG. 6 is a block diagram showing the arrangement of an information processing apparatus according to the third embodiment of the present invention.

FIG. 6 is a block diagram showing the arrangement of an information processing apparatus according to the third embodiment of the present invention.

The characteristic features of this embodiment are as follows. That is, the present invention is applied to a system using a plurality of processors. The information processing apparatus of this embodiment comprises two execution units 4a and 4b, instruction code storage units 2a and 2b corresponding to the execution units 4a and 4b, peripheral simulators 5a and 5b, a shared memory 7 shared by the two execution units 4a and 4b, a bus simulator 6 for controlling an input/output operation among the execution units 4a and 4b, the peripheral simulators 5a and 5b, the shared memory 7, and a predictive interrupt signal control unit 8 which receives predictive interrupt signals (PRE-INTP1 and PRE-INTP2) generated by the peripheral simulators 5a and 5b to give them to the execution units 4a and 4b. The operations of the execution units 4a and 4b, the peripheral simulators 5a and 5b, and the bus simulator 6 are the same as those of the execution unit 4, the peripheral simulator 5, and the bus simulator 6 shown in FIG. 3 or 5.

In the above arrangement, the predictive interrupt signals (PRE-INTP1 and PRE-INTP2) from the peripheral simulators 5a and 5b are supplied to the predictive interrupt signal control unit 8. When the predictive interrupt signal control unit 8 receives the predictive interrupt signals (PRE-INTP1 and PRE-INTP2), the predictive interrupt signal control unit 8 supplies the predictive interrupt signals (PRE-INTP1 and PRE-INTP2) to either of the execution units 4a and 4b. Both the predictive interrupt signals (PRE-INTP1 and PRE-INTP2) are supplied to the predictive interrupt signal control unit 8 to simplify the arrangement. As a result, although an excessive number of predictive interrupt signals (PRE-INTP1 and PRE-INTP2) are supplied to the execution units 4a and 4b, the execution speed only decreases, but the behavior of the user procedure (UPR) itself is correct.

Therefore, in this embodiment, the same effect as that in the embodiment shown in FIG. 5 can be obtained in a system using a plurality of processors.

In this manner, in the arrangement including the plurality of execution units 4a and 4b according to the above embodiment, the predictive interrupt signal (PRE-INTS) may be shared.

As described above, according to the present invention, a predictive interrupt signal is generated one interruption cycle before interruption occurs, and when an instruction which is executed immediately after the predictive interrupt signal is generated has a flag-less instruction identifier, an execution process of the instruction which is executed immediately after the predictive interrupt signal is generated is performed according to not a flag-less instruction code but a flag instruction code. Therefore, a flag operation procedure can be omitted when an instruction simulation is performed in consideration of interruption, an execution time of the instruction simulation can be shortened.

It should be understood that many modifications and adaptations of the invention will become apparent to those skilled in the art and it is intended to encompass such obvious modifications and changes in the scope of the claims appended hereto.

What is claimed is:

1. An information processing apparatus comprising:

a memory for storing an instruction stream which is constituted by instructions having instruction identifiers including a plurality of flag instruction identifiers and a plurality of flag-less instruction identifiers and is required for an instruction simulation, and is analyzed before an instruction simulation is started, and in which a flag instruction identifier of an instruction whose flag operation procedure can be omitted is changed into a flag-less instruction identifier;

an instruction code storage unit for storing the flag instruction identifiers of the instructions and flag instruction codes corresponding to the respective flag instruction identifiers, and the flag-less instruction identifiers of the instructions and flag-less instruction codes corresponding to the flag-less instruction identifiers;

an interrupt generating unit for generating an interrupt signal and generating a predictive interrupt signal one instruction cycle before interruption occurs on the basis of a prediction result obtained by predicting a timing at which interruption occurs by analyzing the instruction stream stored in said memory before the instruction simulation is started; and an execution unit for sequentially reading the instructions from said memory, extracting the instruction identifiers of the read instructions, reading the instruction codes corresponding to the extracted instruction identifiers from said instruction code storage unit, performing an execution process to the instructions on the basis of the read instruction codes, and when a predictive interrupt signal is generated by said interrupt generating unit and an instruction executed immediately after the predictive interrupt signal is generated has a flag-less instruction identifier, when performing an execution process to the instruction executed immediately after according to a flag instruction identifier and performing an execution process to an interrupt process procedure on the basis of the interrupt signal generated by said interrupt generating unit.

2. An information processing apparatus comprising:

a memory for storing an instruction stream which is constituted by instructions having instruction identifiers including a plurality of flag instruction identifiers and a plurality of flag-less instruction identifiers and is required for an instruction simulation, and is analyzed before an instruction simulation is started, and in which a flag instruction identifier of an instruction whose flag operation procedure can be omitted is changed into a flag-less instruction identifier;

an instruction code storage unit for storing the flag instruction identifiers of the instructions and flag instruction codes corresponding to the respective flag instruction identifiers, and the flag-less instruction identifiers of the instructions and flag-less instruction codes corresponding to the flag-less instruction identifiers;

a peripheral simulator, serving as a simulator for a peripheral device, for generating an interrupt signal, and generating a predictive interrupt signal one instruction cycle before interruption occurs on the basis of a prediction result obtained by predicting a timing at which interruption occurs by analyzing the instruction stream stored in said memory before the instruction simulation is started;

an execution unit for sequentially reading the instructions from said memory, extracting the instruction identifiers of the read instructions, reading the instuction codes corresponding to the extracted instruction identifiers from said instruction code storage unit, performing an execution process to the instructions on the basis of the read instruction codes, and when a predictive interrupt signal is generated by said peripheral simulator and an instruction executed immediately after the predictive interrupt signal is generated has a flag-less instruction identifier, then performing an execution process to the instruction executed immediately after according to a flag instruction code and performing an execution process to an interrupt process procedure on the basis of the interrupt signal generated by said interrupt generating unit; and a bus simulator, to which said memory, said peripheral simulator, and said execution unit are connected to perform input control thereof, for giving the predictive interrupt signal generated by said peripheral simulator to said execution unit.

3. An information processing apparatus comprising:

a shared memory for storing an instruction stream which is constituted by instructions having instruction identifiers including a plurality of flag instruction identifiers and a plurality of flag-less instruction identifiers and is required for an instruction simulation, and is analyzed before an instruction simulation is started, and in which a flag instruction identifier of an instruction whose flag operation procedure can be omitted is changed into a flag-less instruction identifier;

a plurality of instruction code storage units for storing the flag instruction identifiers of the instructions and flag instruction codes corresponding to the respective flag instruction identifiers, and the flag-less instruction identifiers of the instructions and flag-less instruction codes corresponding to the flag-less instruction identifiers;

a plurality of peripheral simulators, serving as a simulator for a peripheral device, for generating an interrupt signal, and generating a predictive interrupt signal one instruction cycle before interruption occurs on the basis of a prediction result obtained by predicting a timing at which interruption occurs by analyzing the instruction stream stored in said shared memory before the instruction simulation is started;

a plurality of execution units, which correspond to said plurality of instruction code storage units, for sequentially reading the instructions from said shared memory, extracting the instruction identifiers of the read instructions, reading the instruction codes corresponding to the extracted instruction identifiers from the corresponding instruction code storage unit, performing an execution process to the instructions on the basis of the read instruction codes, and when a predictive interrupt signal is generated by said peripheral simulator and an instruction executed immediately after the predictive interrupt signal is generated has a flag-less instruction identifier, then performing an execution process to the instruction executed immediately after according to a flag instruction code and performing an execution process to an interrupt process procedure on the basis of the interrupt signal generated by said interrupt generating unit;

a signal control unit which receives the predictive interrupt signal generated by said plurality of peripheral simulators to give the predictive interrupt signal to an execution unit corresponding to the predictive interrupt signal; and a bus simulator, to which said shared memory, said plurality of peripheral simulators, and said plurality of execution units are connected to perform input control thereof.

* * * * *